(12) United States Patent
Patman Maguire et al.

(10) Patent No.: US 8,024,347 B2
(45) Date of Patent: Sep. 20, 2011

(54) METHOD AND APPARATUS FOR AUTOMATICALLY DIFFERENTIATING BETWEEN TYPES OF NAMES STORED IN A DATA COLLECTION

(75) Inventors: Frankie Elizabeth Patman Maguire, Washington, DC (US); Friederike Mallchok, Coddington (GB); Leonard Arthur Shaefer, Jr., Leesburg, VA (US); Frank Everett Whaley, Roanoke, VA (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 11/863,209

(22) Filed: Sep. 27, 2007

(65) Prior Publication Data

US 2009/0089284 A1 Apr. 2, 2009

(51) Int. Cl.
G06F 7/00 (2006.01)
G06F 17/00 (2006.01)

(52) U.S. Cl. ........................................ 707/758; 707/769
(58) Field of Classification Search .................. None
See application file for complete search history.

(56) References Cited

U.S. PATENT DOCUMENTS

| | | | |
|---|---|---|---|
| 5,819,263 A | 10/1998 | Bromley et al. | |
| 6,248,039 B1 | 6/2001 | Hibi | |
| 6,408,306 B1 * | 6/2002 | Byrne et al. | 1/1 |
| 6,591,300 B1 | 7/2003 | Yurkovic | |
| 6,778,979 B2 | 8/2004 | Grefenstette et al. | |
| 6,820,076 B2 * | 11/2004 | Bailey et al. | 707/3 |
| 6,871,287 B1 | 3/2005 | Ellingson | |
| 7,162,470 B2 | 1/2007 | Sharma et al. | |
| 7,177,862 B2 * | 2/2007 | Zhang et al. | 707/722 |
| 7,233,937 B2 * | 6/2007 | Subramaniam et al. | 706/62 |
| 7,461,090 B2 * | 12/2008 | Blinn et al. | 707/104.1 |
| 7,502,787 B2 * | 3/2009 | Bailey et al. | 707/6 |
| 7,577,641 B2 * | 8/2009 | Koch et al. | 707/3 |
| 2001/0049674 A1 * | 12/2001 | Talib et al. | 707/1 |
| 2002/0087558 A1 * | 7/2002 | Bailey et al. | 707/10 |
| 2002/0091690 A1 * | 7/2002 | Bailey et al. | 707/6 |
| 2003/0115060 A1 | 6/2003 | Junqua et al. | |
| 2004/0162916 A1 * | 8/2004 | Ryan | 709/245 |
| 2004/0230461 A1 * | 11/2004 | Talib et al. | 705/7 |
| 2004/0243588 A1 * | 12/2004 | Tanner et al. | 707/100 |
| 2005/0065982 A1 * | 3/2005 | Bailey et al. | 707/104.1 |
| 2005/0119875 A1 | 6/2005 | Shaefer, Jr. et al. | |

(Continued)

OTHER PUBLICATIONS

Peter Christen, A Comparison of Personal Name Matching: Techniques and Practical Issues, Sixth IEEE International Conference on Data Mining-Workshops, IEEE Computer Society, 2006, 5 pages, 0-7695-2702-7/06.

(Continued)

Primary Examiner — Kuen S Lu
Assistant Examiner — Tuan Pham
(74) Attorney, Agent, or Firm — Rabindranath Dutta; Konrad Raynes & Victor LLP

(57) ABSTRACT

A method and system for differentiating types of data stored in a data collection. In one implementation, the method includes receiving a search request on a first type of data stored in the data collection; automatically differentiating data of the first type stored in the data collection from data of other types stored in the data collection; and completing the search request using data determined to be of the first type. Automatically differentiating data of the first type includes determining a type of each data entry in the data collection based only on tokens associated with the data entry.

18 Claims, 2 Drawing Sheets

U.S. PATENT DOCUMENTS

| | | |
|---|---|---|
| 2005/0198056 A1 | 9/2005 | Dumais et al. |
| 2005/0246374 A1* | 11/2005 | Blinn et al. ................ 707/104.1 |
| 2006/0031239 A1 | 2/2006 | Koenig |
| 2006/0059185 A1 | 3/2006 | Bocking et al. |
| 2006/0100788 A1* | 5/2006 | Carrino et al. .................. 702/19 |
| 2006/0248039 A1 | 11/2006 | Brooks et al. |
| 2007/0005567 A1* | 1/2007 | Hermansen et al. .............. 707/3 |
| 2007/0005578 A1 | 1/2007 | Patman et al. |
| 2007/0005586 A1 | 1/2007 | Shaefer, Jr. et al. |
| 2007/0011168 A1 | 1/2007 | Koehane et al. |
| 2007/0067280 A1* | 3/2007 | Zhou et al. ....................... 707/5 |
| 2007/0220268 A1* | 9/2007 | Krishnaprasad et al. ..... 713/182 |
| 2008/0059607 A1* | 3/2008 | Schneider .................... 709/218 |
| 2008/0091412 A1 | 4/2008 | Strope et al. |
| 2010/0057713 A1 | 3/2010 | Gillam et al. |

OTHER PUBLICATIONS

Patrick Reuther, Personal Name Matching: New Test Collections and a Social Network Based Approach, Department for Database and Information Systems, Mar. 16, 2006, 23 pages, Trier, Germany.

Amendment 1, Feb. 23, 2011, for U.S. Appl. No. 12/203,451, Total 13 pp.

Office Action 1, Nov. 29, 2010, for U.S. Appl. No. 12/203,451, Total 21 pp.

Wikipedia, "Wikipedia: Lists", [online], [Retrieved on Jul. 23, 2008]. Retrieved from the Internet at <URL: http://en. wikipedia.org/wiki/Wikipedia:Lists>, Total 8 pp.

* cited by examiner

METHOD AND APPARATUS FOR AUTOMATICALLY DIFFERENTIATING BETWEEN TYPES OF NAMES STORED IN A DATA COLLECTION

FIELD OF THE INVENTION

The present invention relates generally to data processing, and more particularly to techniques for differentiating between types of data (e.g., names) in a data collection.

BACKGROUND OF THE INVENTION

A database is a structured collection of various types of records or data. For example, names in structured data collections are often mixed as to type—e.g., both business names and personal names may be included in the same data collection, with no indication of the type (e.g., "business" or "personal") associated with each entry. Name search strategies for record retrieval are generally more effective when the search strategies are specifically adapted to a specific type of name (e.g., a business-specific strategy for business names, or a personal name-specific strategy for personal names). However, automatically making a distinction between various types of names in structured databases is complicated by the lack of surrounding context—i.e., only the name itself is available as input to the decision process.

BRIEF SUMMARY OF THE INVENTION

In general, in one aspect, this specification describes a method for differentiating types of data stored in a data collection. The method includes receiving a search request on a first type of data stored in the data collection, automatically differentiating data of the first type stored in the data collection from data of other types stored in the data collection, and completing the search request using data determined to be of the first type. Automatically differentiating data of the first type includes determining a type of each data entry in the data collection based only on tokens associated with the data entry.

Implementations can include one or more of the following features. Determining a type of each data entry in the data collection can include applying a series of one or more rules to the tokens associated with the data entry. The data stored in the data collection can include names, and automatically differentiating data of the first type stored in the data collection from data of other types stored in the data collection can comprise automatically differentiating personal names stored in the data collection from business names stored in the data collection. Applying a series of one or more rules to the tokens associated with the data entry can include applying one or more rules that consider an order in which tokens appear in a given name to differentiate whether the name is a personal name or a business name. Applying a series of one or more rules to the tokens associated with the data entry can include applying a rule that tests for an ending of ".com", ".net", or ".org" in a given name to determine that the name refers to a business. Applying a series of one or more rules to the tokens associated with the data entry can include applying a rule that tests for "&" or "AND" followed by a pre-determined organization indicator. Completing the search request can include applying a specific search strategy associated with the first type to the data determined to be of the first type, and displaying results of the search strategy to a user.

In general, in another aspect, this specification describes a computer-readable medium encoded with a computer program for differentiating types of data stored in a data collection. The computer program comprising computer executable instructions for receiving a search request on a first type of data stored in the data collection, automatically differentiating data of the first type stored in the data collection from data of other types stored in the data collection, and completing the search request using data determined to be of the first type. The computer executable instructions for automatically differentiating data of the first type include instructions for determining a type of each data entry in the data collection based only on tokens associated with the data entry.

In general, in another aspect, this specification describes a data processing system for differentiating types of data stored in a database. The data processing system includes a database management system (DBMS) to receive a search request on a first type of data stored in the data collection, and a determination engine (of the database management system) to automatically differentiate data of the first type stored in the data collection from data of other types stored in the data collection. The determination engine automatically differentiates data of the first type by determining a type of each data entry in the data collection based only on tokens associated with the data entry, and the database management system (DBMS) completes the search request using data determined to be of the first type.

Implementations may provide one or more of the following advantages. Implementations of a name type determination engine described herein distinguish between types of data, e.g., business names from personal names, in structured data collections without the use of any surrounding contextual information. That is, in one aspect, the name type determination engine does not require, e.g., references to entities found within texts (e.g., news wires, emails, etc.), or any other surrounding textual context to inform the decision process.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

The present invention relates generally to data processing, and more particularly to techniques for differentiating between types of data (e.g., names) in a data collection. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figure 1:
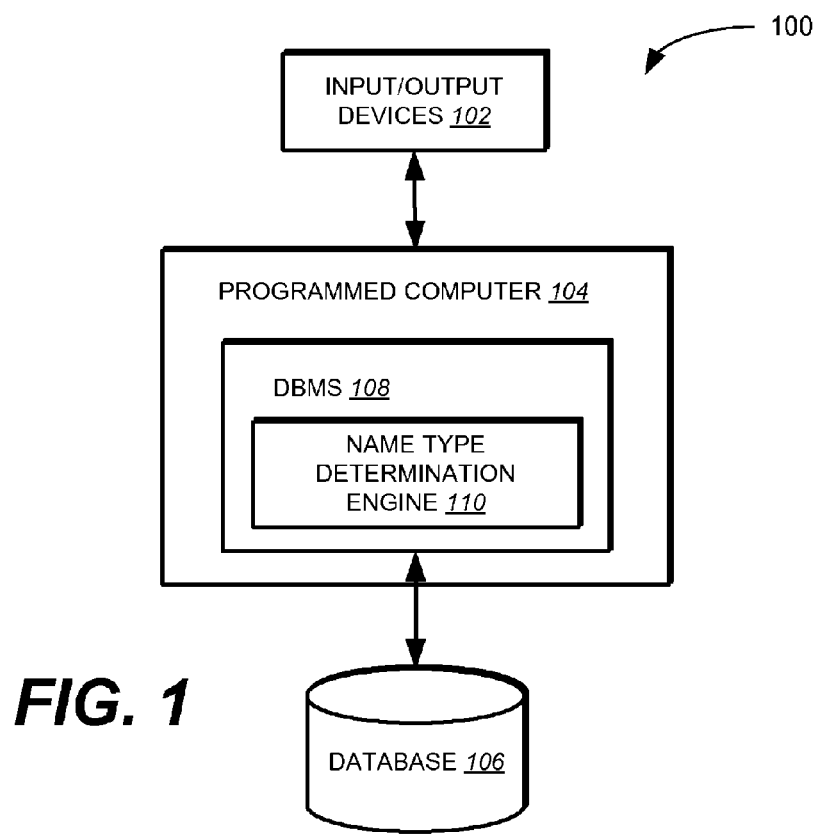
FIG. 1 is a block diagram of a data processing system including a name type determination engine in accordance with one implementation.

FIG. 1 illustrates one implementation a data processing system 100 including input and output devices 102, a programmed computer 104, and a database 106. The input and output devices 102 can include devices such as a printer, a keyboard, a mouse, a digitizing pen, a display, a printer, and the like. The programmed computer 104 can be any type of computer system, including for example, a workstation, a desktop computer, a laptop computer, a personal digital assistant (PDA), a cell phone, a network, and so on. In one implementation, the database 106 is coupled to a database management system (DBMS) 108 running on the programmed computer 104. The database management system 108 can be a relational database management system (e.g., DB2 available from International Business Machines Corporation of Armonk, N.Y.), and the database 106 can be a relational database.

In one implementation, the database 106 is configured to store names with no indication as to type associated with each name. In general, a "type" is any given semantic distinction that can be associated with a name to distinguish the name from another type or group of names. For example, types of names can include school names, business names, personal names, city names, and so on. In one implementation, the database management system (DBMS) 108 includes a name type determination engine 110 that is configured to differentiate between the various types of names stored within the database 106 without the use of any surrounding contextual information associated with the names. Thus, in one implementation, the name type determination engine 110 can determine the type of a given data entry stored in the database 106 based only on tokens associated with the name stored in the data entry. In one implementation, a token is a block of a structured text, including single letters and symbols. In one implementation, the name type determination engine 110 can be a component of a name classifier system associated with a Global Name Recognition (GNR) product available from International Business Machines Corporation.

In one implementation, the name type determination engine 110 applies one or more internal rules (or tests) to a given name to determine a type associated with the name. In one implementation, in which a series of rules are applied to a name, those rules that are less computationally complex (e.g., require less processing time) are applied prior to rules that are more computationally complex. Also, in one implementation, the name type determination engine 110 can first apply rules that are more productive (e.g., rules that are certain to produce correct results) in determining the type of a name.

Figure 2:
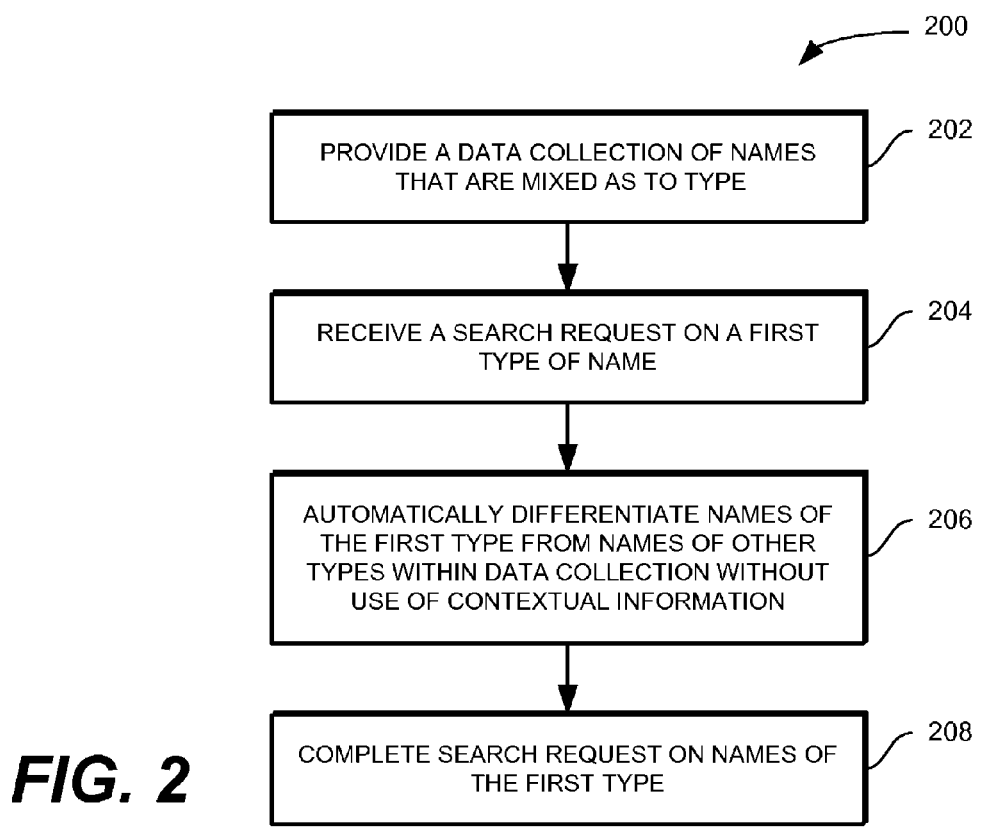
FIG. 2 illustrates a method for differentiating types of names stored in a data collection in accordance with one implementation.

FIG. 2 illustrates one implementation of a method 200 for differentiating types of names stored in a data collection (e.g., database 106). A data collection of names is provided, in which the names are mixed as to type (step 202). In one implementation, a "type" can be any given semantic distinction that can be associated with a name to distinguish the name from another type or group of names—e.g., school names, business names, personal names, city names, and so on. A search request on a first type of name is received (step 204). The search request can be a query, e.g., from a user or an application. Names of the first type (that are stored in the data collection) are automatically differentiated from names of other types (e.g., by name type determination engine 110) (step 206). In one implementation, one or more rules are applied to each name to determine the type of the name. In one implementation, each rule receives as input only the name of within a data entry. Thus, unlike conventional name type determination engines, such as those used with named entity extraction engines, the name type determination engine 110 does not require contextual information associated with a name to determine the type of the name. Once the names having the first type are determined, the search request is completed (e.g., by applying a specific search strategy associated with the first type) to the names stored in the data collection that are of the first type (step 208). Results of the search request can be displayed to a user on an output device such as a display.

Figure 3:
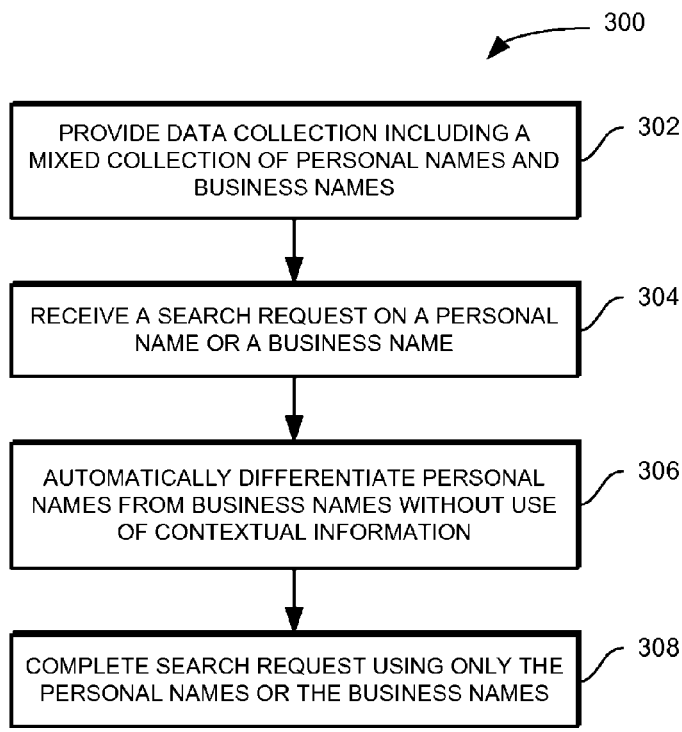
FIG. 3 illustrates a method for differentiating personal names from business names stored in a data collection in accordance with one implementation.

As discussed above, the name type determination engine 110 can differentiate between various types of names that are stored within a data collection. FIG. 3 illustrates one specific implementation of a method 300 that can be implemented to differentiate between personal names and business names stored in a data collection (e.g., database 106). A data collection including a mixed collection of personal names and business names is provided (step 302). A search request on a personal name or a business name is received (step 304). Personal names that are stored in the data collection are automatically differentiated from business names (e.g., by name type determination engine 110) (step 306). In general, in one implementation, the name type determination engine 110 applies one or more rules to differentiate a personal name from a business name. In one implementation, the name type determination engine 110 incorporates one or more of the following types of information as input to a decision process: a frequency-ranked set of over 25 million personal name elements; a frequency-ranked set of tokens found in business names; sets of tokens found uniquely in either personal names or business names; syntactic, morphological, and orthographic patterns associated with either business names or personal names; and a list of well-known business names.

In one implementation, one or more of the rules applied to a given name consider the phrasal syntax associated with the name—i.e., the order (or sequence) in which name tokens appear. For example, names like "Henry Auto Service" or "The House of Glass" might seem to be business names, but each is composed of individual words that are valid personal names (e.g., Henry=Anglo, Auto=Brazilian/French/Portuguese, Service=Jamaican, The=Vietnamese, House=Anglo, Of=Danish, Glass=Anglo). However, the phrases "Auto Service" or "The House of" almost never appear in this exact order as part of personal names. Thus, the presence of these phrases can be used as one technique to separate personal names from business names. There are several thousand such phrases, with different sets of phrases applicable to various cultures and languages (with some overlap). These phrases are capable of identifying hundreds of thousands of business names that would otherwise not be correctly recognized with an acceptable level of confidence. The combination of reference data, techniques used in searching for phrases, and other rules or tests (such as those discussed below) can be used prior to phrase matching to produce results beyond what any individual element can achieve.

Provided below in Table 1 are some example rules that can be applied to names to differentiate personal names from business names.

TABLE 1

| Rule/Test | Description |
| --- | --- |
| Abandon Bad Data | Do not bother with bad pointers, degenerate strings, or excessively long strings (e.g., more than 1000 characters); trim leading and trailing blanks. |
| Look For URL (uniform resource locator) Ending | Look for an ending such as ".com", ".net", or ".org" in a name to determine that the name refers to a business. |
| AND <something> | Look for "&" or "AND" followed by an organization indicator (e.g., COMPANY, COMP, CMPNY, CO, ASSOCIATES, ASSOC, SONS, SON) |
| Single Letters | Test for a series of single letters separated by & or AND; or all single letters. |
| <name> & < name> | Look for a single repeated name separated by "&" or "AND" (e.g., "Wilson & Wilson" or "J & J Auto Repair"). |
| <name1> & <name2> | Check for two word tokens that are deemed to be "names" (not necessarily the same) separated by an ampersand. |
| & <name> | Check for text ending in an ampersand followed by a word token that has been designated to be a name. |
| Trailing Org Word | Test whether final token appears in the "last token only" list (e.g., INC, LLC, LLP, LPC, LTD, PTY). |
| Leading Token | Test whether leading token appears in the "leading only" word list (e.g., CAFE, CAFFE, CASUAL). |
| Matching "The <word> Of" | Test for the phrase "The <word> of" (e.g., The Bank of Morgan Hill). |
| Triplet | Test for a name that begins with a leading triplet of the same letter (e.g.: "AAA Automotive"). |
| Apostrophe Character - 'N for AND | Test whether the name contains an apostrophe character followed by the letter "N" (e.g., "Smith 'N Sons"). |
| Multiple Slashes | Test for multiple slashes within name (e.g., "Smith/Johnson/Jones") |
| Enumeration | Test for $1^{st}$, $2^{nd}$, etc. (e.g., "$1^{st}$ National Bank") |
| Possessive | Test for an apostrophe followed by the letter "S" (e.g.: "Victoria's Crab Shack") |
| Token All Symbols | Test for the case where the incoming text is tokenized and one of the tokens contains ONLY punctuation with an exception list of punctuation that does not distinguish an organizational name from personal name. |
| Phrase Matching | Test for pre-determined phrases that are known to be associated with a business (e.g., "The House Of" and "Auto Service") |
| All Consonants | Test for all consonants in a token that is found within the name (e.g., "WWW" or "BBB"). |

One or more of the method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 4:
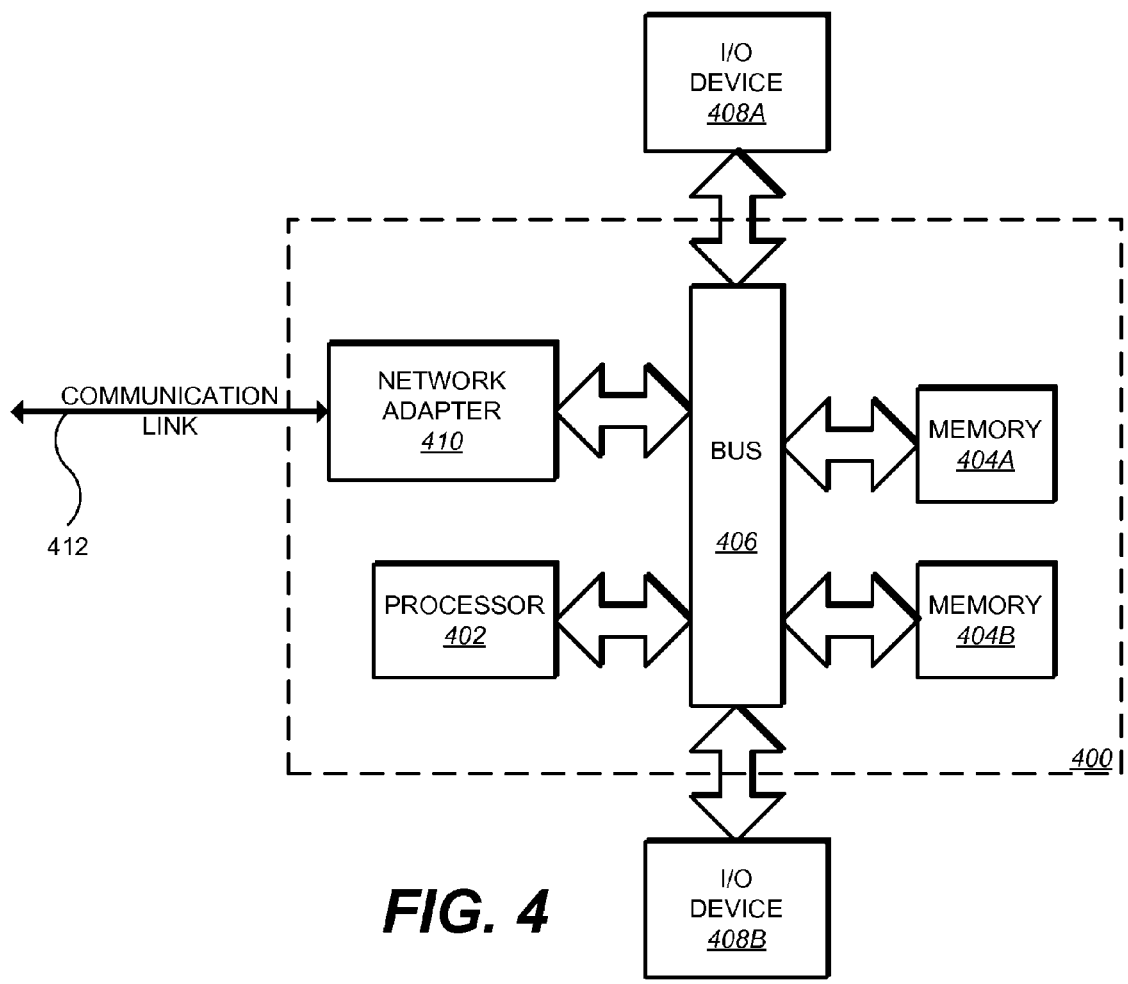
FIG. 4 is a block diagram of a data processing system suitable for storing and/or executing program code in accordance with one implementation of the invention.

FIG. 4 illustrates a data processing system 400 suitable for storing and/or executing program code. Data processing system 400 includes a processor 402 coupled to memory elements 404A-B through a system bus 406. In other implementations, data processing system 400 may include more than one processor and each processor may be coupled directly or indirectly to one or more memory elements through a system bus. Memory elements 404A-B can include local memory employed during actual execution of the program code, bulk storage, and cache memories that provide temporary storage of at least some program code in order to reduce the number of times the code must be retrieved from bulk storage during execution. As shown, input/output or I/O devices 408A-B (including, but not limited to, keyboards, displays, pointing devices, etc.) are coupled to data processing system 400. I/O devices 408A-B may be coupled to data processing system 400 directly or indirectly through intervening I/O controllers (not shown).

In one implementation, a network adapter 410 is coupled to data processing system 400 to enable data processing system 400 to become coupled to other data processing systems or remote printers or storage devices through communication link 412. Communication link 412 can be a private or public network. Modems, cable modems, and Ethernet cards are just a few of the currently available types of network adapters.

Various implementations for differentiating between types of data (e.g., names) in a data collection have been described. Nevertheless, various modifications may be made to the implementations. For example, though the techniques described above refer to differentiating between types of names, the techniques are generally applicable to distinguishing between types of any other data. In addition, steps of the methods described above can be performed in a different order and still achieve desirable results. Accordingly, many modifications may be made without departing from the scope of the following claims.

What is claimed is:

1. A method for differentiating types of data stored in a data collection, the method comprising:
   receiving, in a programmed computer having a processor, a search request on a first type of data stored in the data collection, wherein the first type of data comprises personal names;
   automatically differentiating data of the first type stored in the data collection from data of other types stored in the data collection using a name-type determination engine, wherein said other types of data comprises business names, wherein frequency ranked sets of selected personal names and selected business names are maintained, wherein sets of tokens found uniquely in the selected personal names or the selected business names are maintained, and wherein syntactic, morphological and orthographic patterns associated with the selected business names or the selected personal names are maintained; and
   completing the search request in the programmed computer using data determined to be of the first type, wherein automatically differentiating data of the first type includes determining a type of each data entry in the data collection based only on tokens associated with the data entry, and applying a series of one or more rules to the tokens associated with the data entry,
   wherein applying a series of one or more rules to the tokens associated with the data entry comprises applying a rule that tests for presence of selected phrases in a given name to determine that the given name refers to a business, wherein each of the selected phrases is comprised of at least two valid personal names, and wherein the one of more rules additionally test:
   whether the given name contains an apostrophe character;
   whether the given name contains an enumeration;
   whether the given name contains an apostrophe followed by the letter "S"; and
   whether the given name contains a plurality of slashes.

2. The method of claim 1, wherein:
   the data stored in the data collection comprises names; and
   automatically differentiating data of the first type stored in the data collection from data of other types stored in the data collection comprises automatically differentiating personal names stored in the data collection from business names stored in the data collection.

3. The method of claim 2, wherein applying a series of one or more rules to the tokens associated with the data entry comprises applying one or more rules that consider an order in which tokens appear in a given name to differentiate whether the name is a personal name or a business name.

4. The method of claim 2, wherein applying a series of one or more rules to the tokens associated with the data entry comprises applying a rule that tests for an ending of ".com", ".net", or ".org" in a given name to determine that the name refers to a business.

5. The method of claim 1, wherein applying a series of one or more rules to the tokens associated with the data entry comprises applying a rule that tests for "&" or "AND" followed by a pre-determined organization indicator.

6. The method of claim 1, wherein completing the search request comprises:
   applying a specific search strategy associated with the first type to the data determined to be of the first type; and
   displaying results of the search strategy to a user.

7. A computer-readable storage medium comprising hardware, wherein the computer readable storage medium is encoded with a computer program for differentiating types of data stored in a data collection, the computer program comprising computer executable instructions for:
   receiving a search request on a first type of data stored in the data collection, wherein the first type of data comprises personal names;
   automatically differentiating data of the first type stored in the data collection from data of other types stored in the data collection, wherein said other types of data comprises business names, wherein frequency ranked sets of selected personal names and selected business names are maintained, wherein sets of tokens found uniquely in the selected personal names or the selected business names are maintained, and wherein syntactic, morphological and orthographic patterns associated with the selected business names or the selected personal names are maintained; and
   completing the search request using data determined to be of the first type,
   wherein automatically differentiating data of the first type includes determining a type of each data entry in the data collection based only on tokens associated with the data entry, and applying a series of one or more rules to the tokens associated with the data entry, wherein applying a series of one or more rules to the tokens associated with the data entry comprises applying a rule that tests for presence of selected phrases in a given name to determine that the given name refers to a business, wherein each of the selected phrases is comprised of at least two valid personal names, and wherein the one or more rules additionally test:
   whether the given name contains an apostrophe character;
   whether the given name contains an enumeration;
   whether the given name contains an apostrophe followed by the letter "S"; and
   whether the given name contains a plurality of slashes.

8. The computer-readable storage medium of claim 7, wherein:
   the data stored in the data collection comprises names; and
   the computer executable instructions for automatically differentiating data of the first type stored in the data collection from data of other types stored in the data collection comprises instructions for automatically differentiating personal names stored in the data collection from business names stored in the data collection.

9. The computer-readable storage medium of claim 8, wherein the computer executable instructions for applying a series of one or more rules to the tokens associated with the data entry comprises instructions for applying one or more rules that consider an order in which tokens appear in a given name to differentiate whether the name is a personal name or a business name.

10. The computer-readable storage medium of claim 8, wherein the computer executable instructions for applying a series of one or more rules to the tokens associated with the data entry comprises instructions for applying a rule that tests for an ending of ".com", ".net", or ".org" in a given name to determine that the name refers to a business.

11. The computer-readable storage medium of claim 7, wherein the computer executable instructions for applying a series of one or more rules to the tokens associated with the data entry comprises instructions for applying a rule that tests for "&" or "AND" followed by a pre-determined organization indicator.

12. The computer-readable storage medium of claim 7, wherein the computer executable instructions for completing the search request comprises instructions for:
applying a specific search strategy associated with the first type to the data determined to be of the first type; and
displaying results of the search strategy to a user.

13. A data processing system for differentiating types of data stored in a database, the data processing system comprising:
a processor; and
a database management system (DBMS) to receive a search request on a first type of data stored in the data collection wherein the first type of data comprises personal names;
a determination engine of the database management system programmed to automatically differentiate data of the first type stored in the data collection from data of other types stored in the data collection wherein said other types of data comprises business names, the determination engine automatically differentiating data of the first type by determining a type of each data entry in the data collection based only on tokens associated with the data entry and by applying a series of one or more rules to the tokens associated with the data entry, wherein frequency ranked sets of selected personal names and selected business names are maintained, wherein sets of tokens found uniquely in the selected personal names or the selected business names are maintained, and wherein syntactic, morphological and orthographic patterns associated with the selected business names or the selected personal names are maintained,
wherein the database management system (DBMS) completes the search request using data determined to be of the first type, wherein the determination engine automatically differentiating data of the first type stored in the data collection from data of other types stored in the data collection comprises the determination engine applying a rule that tests for presence of selected phrases in a given name to determine that the given name refers to a business, wherein each of the selected phrases is comprised of at least two valid personal names, and wherein the one of more rules additionally test:
whether the given name contains an apostrophe character;
whether the given name contains an enumeration;
whether the given name contains an apostrophe followed by the letter "S"; and
whether the given name contains a plurality of slashes.

14. The data processing system of claim 13, wherein:
the data stored in the data collection comprises names; and
the determination engine automatically differentiating data of the first type stored in the data collection from data of other types stored in the data collection comprises the determination engine automatically differentiating personal names stored in the data collection from business names stored in the data collection.

15. The data processing system of claim 14, wherein the determination engine automatically differentiating personal names stored in the data collection from business names stored in the data collection comprises the determination engine applying one or more rules that consider an order in which tokens appear in a given name to differentiate whether the name is a personal name or a business name.

16. The data processing system of claim 14, wherein the determination engine automatically differentiating data of the first type stored in the data collection from data of other types stored in the data collection comprises the determination engine applying a rule that tests for an ending of ".com", ".net", or ".org" in a given name to determine that the name refers to a business.

17. The data processing system of claim 13, wherein the database is a relational database.

18. The data processing system of claim 13, wherein applying a series of one or more rules to the tokens associated with the data entry comprises applying a rule that tests for "&" or "AND" followed by a pre-determined organization indicator.

* * * * *